US010345427B2

(12) United States Patent
Barrau et al.

(10) Patent No.: US 10,345,427 B2
(45) Date of Patent: Jul. 9, 2019

(54) METHOD FOR TRACKING THE NAVIGATION OF A MOBILE CARRIER WITH AN EXTENDED KALMAN FILTER

(71) Applicants: SAFRAN ELECTRONICS & DEFENSE, Boulogne-Billancourt (FR); ASSOCIATION POUR LA RECHERCHE DEVELOPPEMENT DES METHODES ET PROCESSUS INDUSTRIELS-A.R.M.I.N.E.S., Paris (FR)

(72) Inventors: Axel Barrau, Boulogne-Billancourt (FR); Silvere Bonnabel, Paris (FR)

(73) Assignees: SAFRAN ELECTRONICS & DEFENSE, Boulogne-Billancourt (FR); ASSOCIATION POUR LA RECHERCHE DEVELOPPEMENT DES METHODES ET PROCESSUS INDUSTRIELS-A.R.M.I.N.E.S., Paris (FR)

( * ) Notice: Subject to any disclaimer, the term of this patent is extended or adjusted under 35 U.S.C. 154(b) by 58 days.

(21) Appl. No.: 15/563,262

(22) PCT Filed: Apr. 1, 2016

(86) PCT No.: PCT/EP2016/057280
§ 371 (c)(1),
(2) Date: Sep. 29, 2017

(87) PCT Pub. No.: WO2016/156602
PCT Pub. Date: Oct. 6, 2016

(65) Prior Publication Data
US 2018/0095159 A1 Apr. 5, 2018

(30) Foreign Application Priority Data
Apr. 1, 2015 (FR) ...................................... 15 00654

(51) Int. Cl.
*G01S 5/02* (2010.01)
*G01C 21/16* (2006.01)
(Continued)

(52) U.S. Cl.
CPC ............ *G01S 5/0294* (2013.01); *G01C 21/16* (2013.01); *G01C 21/165* (2013.01); *G06F 17/11* (2013.01); *G06F 17/16* (2013.01); *H04W 4/02* (2013.01)

(58) Field of Classification Search
CPC ..... G01S 5/0294; G01C 21/16; G01C 21/165; G06F 17/11; G06F 17/16; H04W 4/02
(Continued)

(56) References Cited

U.S. PATENT DOCUMENTS 8,515,672 B1* 8/2013 Snyder ................... G01C 21/00
701/510
9,223,007 B2* 12/2015 Wellman ............. G01C 21/165
(Continued)

FOREIGN PATENT DOCUMENTS

| EP | 1801539 A1 | 6/2007 |
| FR | 3013830 A1 | 5/2015 |
| WO | 2005/071431 A1 | 8/2005 |

OTHER PUBLICATIONS

Preliminary Research Report received for French Application No. 1500654, dated Feb. 12, 2016, 3 pages (1 page of French Translation Cover Sheet and 2 pages of original document).
(Continued)

*Primary Examiner* — Marthe Y Marc-Coleman
(74) *Attorney, Agent, or Firm* — Womble Bond Dickinson (US) LLP

(57) ABSTRACT

A method for tracking the navigation of a mobile carrier, in which an extended Kalman filter estimates, over successive iterations, a navigation state of the carrier. Each iteration
(Continued)

propagates a previous navigation state of the carrier into a propagated state, updates the propagated state according to measurements acquired by at least one navigation sensor. The updating includes: calculating a linear correction term from an innovation representative of a difference between the measurements acquired by the navigation sensor and the propagated state, calculating an exponential of the linear correction in terms of a Lie group, calculating a first correction term expressed in a reference frame that is fixed relative to the carrier, calculating a second correction term expressed in an inertial reference frame in which the carrier is mobile, and adding the second correction term to the value of the variable contained in the propagated state.

15 Claims, 3 Drawing Sheets

(51) Int. Cl.
　　*G06F 17/11*　　　(2006.01)
　　*G06F 17/16*　　　(2006.01)
　　*H04W 4/02*　　　(2018.01)

(58) Field of Classification Search
　　USPC .......................................................... 701/510
　　See application file for complete search history.

(56) References Cited

U.S. PATENT DOCUMENTS

2004/0150557 A1* 8/2004 Ford .................... G01C 21/165
　　　　　　　　　　　　　　　　　　　　342/357.32
2016/0290808 A1　10/2016 Barrau et al.

OTHER PUBLICATIONS

International Search Report and Written Opinion received for PCT Patent Application No. PCT/EP2016/057280, dated Jul. 11, 2016, 14 pages (6 pages of English Translation and 8 pages of Original Document).
International Preliminary Report on Patentability received for PCT Patent Application No. PCT/EP2016/057280, dated Oct. 12, 2017, 12 pages (6 pages of English Translation and 6 pages of Original Document).
Barrau et al., "The Invariant Extended Kalman filter as a stable observer", Oct. 24, 2014, 34 pages, Available at <http://arxiv.org/pdf/1410.1465v3.pdf>.

* cited by examiner

METHOD FOR TRACKING THE NAVIGATION OF A MOBILE CARRIER WITH AN EXTENDED KALMAN FILTER

FIELD OF THE INVENTION

The invention relates to the field of tracking of a mobile carrier device from incomplete or noisy measurements.

The invention more particularly relates to a method for tracking a mobile carrier device in which is applied an extended Kalman filter of a particular type.

STATE OF THE ART

A Kalman filter is a tool well known for tracking a carrier device such as a ship, an aircraft or a land vehicle, i.e. its position, its speed, its acceleration, etc.

The Kalman filter estimates during successive iterations a navigation state of the carrier device via matrix equations, therefore linear equations, by means of noisy measurements provided by navigation sensors.

The carrier device is then assimilated to a dynamic system governed by linear equations, which form a constraining limitation.

In order to extend the Kalman filter to dynamic systems governed by non-linear equations, a method designated under the expression of "extended Kalman filter" (EKF) was proposed. This development proposes an additional step consisting of linearizing, at each new iteration of the filter, the equations governing the non-linear system in a point of the vector space, this point being typically a state estimated during a preceding iteration. The matrices from this linearization may thus be used for calculating a new state estimated according to the conventional Kalman filter method.

Known extended Kalman filters however have the drawback of not operating correctly if the linearization point is too far from the real navigation state of the carrier device.

Now, in certain tracking contexts, no accurate estimation of the state of navigation of the carrier device is available for the starting of the filter, so that the application of the successive iterations of the extended Kalman filter does not give the possibility of converging towards an accurate estimation of the state.

In order to solve this problem within the particular scope of alignment of a carrier device, a first method was proposed, comprising three phases: searching for a vertical direction, and then a first alignment providing a relatively coarse estimation on the basis of the vertical, and then a second alignment using the coarse estimation for obtaining a more accurate estimation.

This method suffers from many drawbacks: it is difficult to handle, should be the object of consequent adaptation to the relevant context, the movements of the carrier device are constrained during the alignment phase, and the application in three successive phases slows down the convergence.

Also, the applicant has proposed in application FR 1401512 filed on Jul. 4, 2014, a second method providing an answer to the aforementioned linearization problem, this method proposing the application of two parallel processing operations: a basic treatment comprising certain changes of variables giving the possibility of applying a particular extended Kalman filter, called a "invariant" Kalman filter, and a simplified processing operation estimating the state of the real system by a development of the first order around the estimation of the invariant filter. Both processing operations operate simultaneously in parallel.

The second method converges more rapidly than the first method, and the difficulties related to the transitions encountered within the scope of applying the first method are suppressed.

However, both processing levels of the second method are complexed to coordinate in real time. The algorithm is inserted with difficulty in an architecture provided by a conventional extended Kalman filter.

Further, the behavior of this second method in the case when the errors from the sensors (bias/scale factors/settings) are large and difficult to predict.

GENERAL PRESENTATION OF THE INVENTION

An object of the invention is to estimate a navigation state of a carrier device governed by a system of non-linear equations, by means of an estimator capable of converging even when this estimator is configured with initial conditions far from the real navigation state of the carrier device.

Another object of the invention is to propose a method which is more adapted to an execution in real time than the solutions of the prior art presented above.

Consequently a method is proposed for tracking a mobile carrier device, wherein an extended Kalman filter estimates during successive iterations a navigation state of the carrier device, an iteration of the filter comprising the steps of:
propagating a preceding navigation state of the carrier device into a propagated state according to a cinematic model and/or to measurements acquired by at least one inertial sensor,
updating the propagated state according to measurements acquired by at least one navigation sensor,
wherein, for at least one navigation variable of the carrier device contained in the propagated state, the updating comprises sub-steps of:
calculation of a linear correction term from an innovation representative of a deviation between the measurements acquired by the navigation sensor and the propagated state, and
calculation of an exponential of the linear correction in the sense of a Lie group,
calculation of a first corrective term expressed in a fixed reference system relatively to the carrier device, the first corrective term depending on said exponential,
calculation of a second corrective term expressed in an inertial reference system wherein the carrier device is mobile, by a reference system change applied to the first corrective term,
addition of the second corrective term to the value of the variable contained in the propagated state, the state containing the result of this addition being used as an output state of the iteration.

The step for updating this method is not conventional with respect to those encountered in the methods of the state of the art based on an extended Kalman filter. This modified updating step defines a correction term in the reference system of the carrier device which has the effect of suppressing the linearization problems mentioned earlier. In other words, the extended Kalman filter may converge towards an accurate estimation even when the linearization is applied in a point too far from the actual state of the carrier device.

Moreover, it is observed that the proposed method does not require the simultaneous execution of two processing operations in parallel; it is therefore more adapted to real-time constraints than the method described in application FR 1401512, in spite of a comparable convergence rapidity.

The method may also comprise the following features, taken alone or as a combination when this is technically possible.

The linear correction may be equal to the innovation multiplied by a Kalman gain.

The calculation of the second corrective term may comprise a multiplication of a rotation matrix with the first corrective term.

The method may further comprise an adjustment of at least one of the corrective terms, before its use by the filter, by means of an ageing transformation of said corrective term during the duration of an iteration of the extended Kalman filter.

The adjustment of the corrective term comprises sub-steps of:
  additional correction of the corrective term according to a deviation stored in memory representing an accumulated approximation error in the application of an ageing transformation of at least one preceding iteration of the filter,
  application of the ageing transformation to the shifted corrective term.

The adjustment of a first corrective term may be applied by means of a transformation comprising a basis change of the first corrective term, the destination basis being invariant under the action of a group.

The adjustment of such a first corrective term may comprise a transformation of the linear corrective term $\epsilon$ of the following form:

$$\epsilon \rightarrow \Phi\epsilon$$

wherein $\Phi$ is a matrix for which at least one block is calculated by the formula $\mathrm{Ad}(X_{t+\Delta t})^{-1}\,\tilde{F}\,\mathrm{Ad}(X_t)$, $\mathrm{Ad}(.)$ being an adjoint matrix in the sense of the Lie group theory, $\tilde{F}$ is a propagation matrix, and $\Delta t$ is a period of iteration of the extended Kalman filter.

$\tilde{F}$ may appear in one of the following forms:

$$\tilde{F} = \begin{pmatrix} I_3 & 0_{3,3} & 0_{3,3} \\ \int g & I_3 & 0_{3,3} \\ \iint g & \Delta T \cdot I_3 & I_3 \end{pmatrix}; \text{ or}$$

$$\tilde{F} = \begin{pmatrix} I_3 & 0_{3,3} \\ \int g & I_3 \end{pmatrix}; \text{ or}$$

$$\tilde{F} = I_6;$$

wherein
  $\int g$ designates the integral of the gravity vector calculated in an estimated position of the carrier device between the instants t and t+$\Delta$t;
  $\iint g$ designates the double integral of the gravity vector calculated in an estimated position of the carrier device between the instants t and t+$\Delta$t;
  $I_3$ designates an identity block of order 3,
  $0_{3,3}$ designates a square block of order 3 for which the terms are zero.

The propagation step may moreover apply a Riccati equation of the following form:

$$P_{t+\Delta t} = \Phi P_t \Phi^T + \Delta t \cdot Q$$

wherein $\Phi$ is a matrix for which at least one of the blocks is calculated by the formula $\mathrm{Ad}(\hat{X}_{t+\Delta t})^{-1}\,\tilde{F}\,\mathrm{Ad}(\hat{X}_t)$, $\mathrm{Ad}(.)$ being an adjoint matrix in the sense of the Lie group theory, $\tilde{F}$ is a propagation matrix, and $\Delta t$ is a period of iteration of the extended Kalman filter.

The steps of the method may be applied by a plurality of Kalman filters configured with different initial conditions, and operating in parallel so as to produce a plurality of candidate estimations of the navigation state of the carrier device; in this case, the method may further comprise the production of a consolidated estimation of the navigation state of the carrier device from the plurality of candidate estimations, the consolidated estimation depending on a comparison between each candidate estimation and the measurements acquired by the navigation sensor.

At least one of the navigation sensors may be a receptor for radio navigation signals emitted by satellites.

According to a second aspect, the invention further proposes a computer program product comprising code instructions of a program for executing steps of the method for tracking navigation which precedes.

According to a third aspect, the invention proposes a device for tracking a mobile carrier device comprising:
  an interface for receiving measurements acquired by at least one inertial sensor,
  an interface for receiving secondary measurements acquired by at least one navigation sensor,
  at least one processor configured for applying an extended Kalman filter during successive iterations for estimating a navigation state of the carrier device, an iteration of the filter comprising steps for:
    propagation of a preceding navigation state into a propagated state depending on a cinematic model and/or on primary measurements,
    updating the propagated state according to navigation measurements,
  the processor being further configured for updating at least one navigation variable of the propagated state with sub-steps of:
    calculation of a linear correction term from an innovation representative of a deviation between the measurements acquired by the navigation sensor and the propagated state, and
    calculation of an exponential of the linear correction in the sense of a Lie group,
    calculation of a first corrective term expressed in a fixed reference system relatively to the carrier device, the first corrective term depending on said exponential,
    calculation of a second corrective term expressed in an inertial reference system wherein the carrier device is mobile, by a reference system change applied to the first corrective term,
    addition of the second corrective term to the value of the variable in the propagated state, the state containing the result of this addition being used as an output state of the iteration.

A navigation central unit is also proposed for a mobile carrier device, comprising at least one inertial sensor, at least one navigation sensor, and at least one tracking device according to the third aspect.

At least one navigation sensor may be a receptor of radio navigation signals emitted by satellites.

DESCRIPTION OF THE FIGURES

Other features, objects and advantages of the invention will become apparent from the description which follows, which is purely illustrative and non-limiting, and which should be read with reference to the appended drawings wherein.

On the whole of the figures, the similar elements bear identical references.

DETAILED DESCRIPTION OF THE INVENTION

Figure 1:
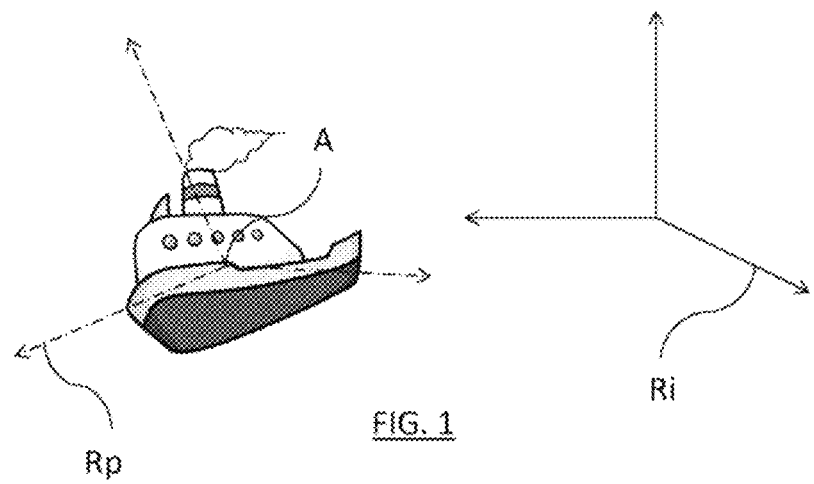
FIG. 1 schematically illustrates a mobile carrier device, and two reference systems involved in calculations applied by a navigation central unit according to an embodiment of the invention.

With reference to FIG. 1, a carrier device A, is mobile in an inertial reference system Ri. The carrier device A is here a ship but may alternatively be an aircraft, or a land vehicle.

An example of an inertial reference system Ri is the reference system centered on the center of the Earth, for which the z axis points towards the north pole, for which the x axis points towards the intersection of the Greenwich meridian and of the equator at time t=0 (the thereby defined point will then be displaced in our reference system because of the rotation of the Earth) and for which the y axis points in the direction of the vector z×x, x designating the vector product).

A reference system Rp attached to the carrier device A is defined. Rp is called a carrier device reference system or a measurement reference system in the following. For example, the axes of the carrier device reference system used most frequently are directed towards the front, the right and the bottom of the central unit. Its origin is a fixed point of the carrier device.

Figure 2:
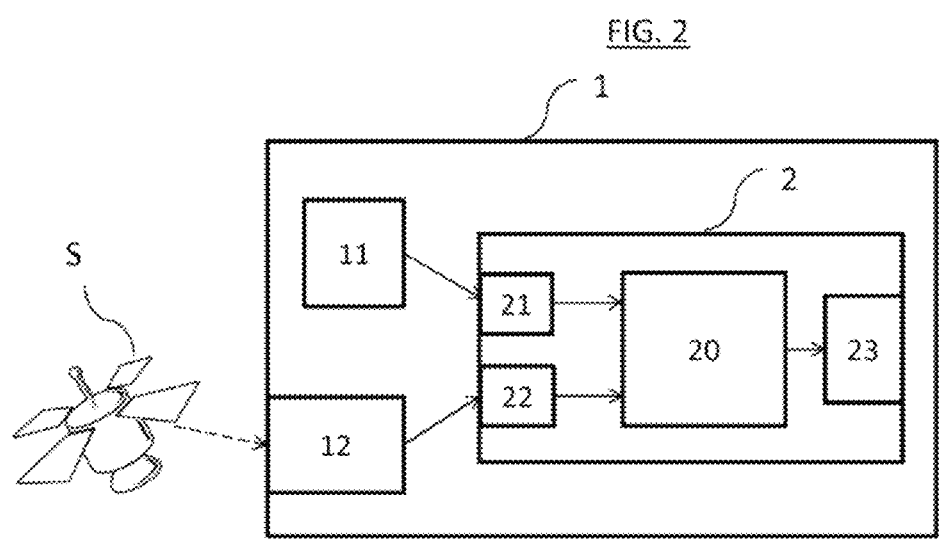
FIG. 2 illustrates a navigation central unit according to an embodiment of the invention, for a mobile carrier device.

With reference to FIG. 2, a navigation central unit 1 is loaded onboard the carrier device A comprising at least one primary sensor 11, at least one secondary sensor 12, and a tracking device 2.

The navigation central unit 1 is attached to the structure of the carrier device A; accordingly, the central unit 1 is immobile in the reference system of the carrier device Rp.

In the following, the non-limiting example of an inertial/GNSS hybrid navigation central unit 1.

This inertial GNSS hybrid navigation central unit 1 comprises at least six primary sensors 11 of the inertial sensor type: three accelerometers and three gyrometers.

The inertial sensors 11 are configured for acquiring measurements in the reference system of the carrier device Rp.

The navigation central unit 1 moreover comprises, as a secondary sensor 12, at least one receptor for navigation signals emerging from satellites S (GNSS, GPS or equivalent).

The tracking device 2 comprises a primary interface 21 for receiving measurements acquired by the primary sensors 11, a secondary interface 22 for receiving measurements acquired by the secondary sensors 12, and at least one processor 20 configured for applying an extended Kalman filter (generally designated by the acronym EKF in the literature).

The extended Kalman filter EKF is an algorithm which may be coded in the form of a computer program executable by the processor 20.

The tracking device 2 further comprises an output 23 for delivering output data calculated by the processor 20.

Extended Kalman Filter

In a known way, an extended Kalman filter EKF is a recursive estimator of a representative state of the navigation of the carrier device, called subsequently the navigation state.

This navigation state may comprise at least one navigation variable of the carrier device (position, speed, acceleration, orientation, etc.). The navigation state may in any case be illustrated as a vector for which each component is a navigation variable of the carrier device.

Subsequently an embodiment is considered in which the navigation state comprises the following navigation variables:
  a position vector x of the carrier device of dimension 3,
  a speed vector v of the carrier device of dimension 3,
  An orientation matrix R of the carrier device, defined as a rotation matrix allowing the reference system change from the carrier device reference system Rp towards the inertial reference system Ri.

The state comprises moreover N additional variables which may be for example perturbations of the measurements of the sensors:
  a vector of dimension 3 containing drifts of the gyrometers in the reference system of the carrier device Rp,
  a vector of dimension 3 containing biases of the accelerometers in the reference system of the carrier device Rp,
  a vector of dimension 9 containing scale factors and adjustment errors of the gyrometers,
  a vector of dimension 9 containing scale factors and adjustment errors of the accelerometers.

In this case one has N=24. The additional variables are gathered in a vector of size N and noted as b.

The estimated quantities will subsequently be noted with circumflexes ($\hat{x}$, $\hat{v}$, $\hat{R}$, $\hat{b}$) and real quantities without any circumflexes (x, v, R, b).

The extended Kalman filter EKF is configured with a cinematic model of the carrier device A. This model may typically be represented by a non-linear propagation function. This propagation function models the time-dependent change of the navigation variables of the navigation state of the carrier device between two instants.

The Kalman filter EKF is further configured with an observation model, or observation function, which models the behavior of the secondary sensors used (here said or each GNSS receptor). The observation function notably gives the possibility of taking into account measurement errors committed by the secondary sensors. The observation function may be non-linear.

The extended Kalman filter is applied by successive iterations.

The filter is initialized with an initial state, which will be used as an input for a first iteration of the filter. Each following iteration of the filter assumes at the input a state estimated by a preceding iteration of the filter, and provides a new estimation of the state of the carrier device.

Figure 3:
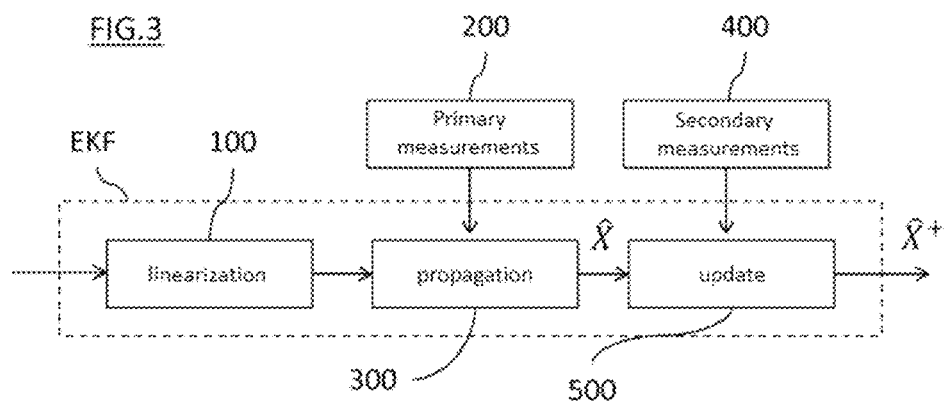
FIG. 3 illustrates the steps of a method for tracking a mobile carrier device by means of an extended Kalman filter, according to an embodiment of the invention, FIG. 4 details sub-steps of an updating step comprised in the method of FIG. 3.

With reference to FIG. 3, an iteration of the extended Kalman filter conventionally comprises three steps: linearization 100, propagation 300, and update 500.

The linearization step 100 is applied according to the description which is given of it in the introduction. Here as a reminder, this step 100 uses a preceding state as a linearization point, so as to approximate the propagation and observation functions with linear functions. These linear functions are then used during propagation 300 and updating 500 steps.

The propagation step 300 determines a propagated state $\hat{X}$ of the carrier device from the preceding state of the carrier device (or the initial state for the first iteration), and this by means of the linearized propagation function.

The propagation step 300 further produces a covariance matrix P representative of an uncertainty on the acquired measurements.

The propagation 300 applies a Riccati equation of the following form:

$$P_{t+\Delta T} = \Phi P_t \Phi^T + \Delta T \cdot Q$$

wherein Q is the covariance matrix of the noise of the model defined by the uncertainty in the measurements of the different sensors, $\Delta t$ is an iteration period of the extended Kalman filter, and $\Phi$ is the solution in t+$\Delta$t of a differential equation of the form $\Phi_t$=Id, $$\frac{d}{dz}\Phi_s = F_s \Phi_s,$$

$F_s$ being the propagation matrix of the errors of the first order, all the errors of the movement variables being projected in the reference system attached to the estimated state of the carrier device. Here one has:

$$\frac{d}{dt}\begin{pmatrix} \xi \\ \hat{R}^T(v-\hat{v}) \\ \hat{R}^T(x-\hat{x}) \\ b-\hat{b} \end{pmatrix} \approx F_s \begin{pmatrix} \xi \\ \hat{R}^T(v-\hat{v}) \\ \hat{R}^T(x-\hat{x}) \\ b-\hat{b} \end{pmatrix}$$

Wherein $\xi$ is defined in the first order by $\hat{R}^T R \approx A(\xi)$ with:

$$A\begin{pmatrix} u_1 \\ u_2 \\ u_3 \end{pmatrix} = \begin{pmatrix} 0 & -u_3 & u_2 \\ u_3 & 0 & -u_1 \\ -u_2 & u_1 & 0 \end{pmatrix}$$

The Riccati equation may also assume the more conventional form between t and t+$\Delta$t:

$$\frac{d}{dt}P = F_t P + P F_t^T + Q$$

In an optimized form of the calculations, one of the blocks of $\Phi$ is calculated without resorting to a differential equation, by the formula: $\Phi = Ad(\hat{X}_{t+\Delta t})^{-1} \tilde{F} Ad(\hat{X}_t)$, wherein $\hat{X}_t$ is the estimated value of the movement variables, Ad(.) is an adjoint matrix in the sense of the Lie group theory and $\tilde{F}$ is a propagation matrix.

According to a first alternative, the matrix $\tilde{F}$ has the following form:

$$\tilde{F} = \begin{pmatrix} I_3 & 0_{3,3} & 0_{3,3} \\ \int g & I_3 & 0_{3,3} \\ \int\int g & \Delta t \cdot I_3 & I_3 \end{pmatrix}$$

According to a second alternative, $\tilde{F}$ has the following form:

$$\tilde{F} = \begin{pmatrix} I_3 & 0_{3,3} \\ \int g & I_3 \end{pmatrix}$$

According to a third alternative, $\tilde{F}$ has the following form:

The propagation equations may involve primary measurements acquired 200 by the primary sensors 11.

Secondary measurements $Y_{GPS}$ are measured by the secondary sensors 12 in the step 400, these measurements being expressed in the reference system of the carrier device Rp. The measurements $Y_{GPS}$ are received by the secondary interface 22 which transmits them to the processor 20 in order to be processed.

In the updating step 500, the processor 20 corrects the propagated state $\hat{X}$ produced by the propagation step 300, by means of the linearized observation function and by using the secondary measurements provided by the secondary sensors 12 in step 400. The updated state produced by this step 500 is called subsequently $\hat{X}^+$.

The updated state $\hat{X}^+$ is provided on the output 23.

It is noted that in the case of the application of the extended Kalman filter considered here, two types of measurements are involved respectively in the propagation steps 300 and the application steps 500 (the measurements provided by the primary sensors 11 and secondary sensors 12).

The operation is typical of a hybrid central unit, wherein secondary measurements are used for consolidating the primary measurements. It is nevertheless possible to provide that the propagation step does not use any measurements, but only a cinematic model for propagating the preceding state into the propagated state $\hat{X}$. In this case, only the measurements provided by the secondary sensors 12 are used by the extended Kalman filter during the updating 500.

The steps 100 to 500 are then repeated during each iteration of the extended Kalman filter executed by the processor 20.

In an embodiment, the processor 20 executes several extended Kalman filters in parallel, which use the same primary and secondary measurements.

However, the different extended Kalman filters operating in parallel are initialized with different initial conditions (these initial conditions are in this case the selected variable values in the state which is used as the linearization point during the step for linearizing the first iteration of each filter).

Each Kalman filter therefore provides a candidate distinct estimation of the state of the carrier device.

A consolidation step may then be applied, producing a consolidated estimation of the navigation state of the carrier device from the candidate estimations, the consolidated estimation depending on a comparison between each candidate estimation and the measurements acquired by the secondary sensor.

The consolidation step may for example select one of the candidate estimations as a consolidated estimation. Alternatively, several candidate estimations are combined by calculation in order to produce the consolidated estimation.

Sub-steps of the updating step 500 will now be more specifically detailed, with reference to FIG. 3.

The processor 20 calculates in a step 501 an innovation Z representative of a deviation between the measurements $Y_{GPS}$ acquired by the secondary sensors 12 and the propagated state $\hat{X}$.

The innovation is calculated in the reference system of the carrier device. If the secondary measurement is a position, the innovation is typically calculated by means of the following formula:

$$Z=\hat{R}^T(Y_{GPS}-\hat{x})$$

The processor 20 moreover calculates a Kalman gain K by means of the following equations:

$$S=HPH^T+\Sigma$$

$$K=PH^TS^{-1}$$

In the above equations, $\Sigma$ is the assumed covariance matrix of the noise the measurement of the secondary sensors in the reference system of the carrier device (it may depend on the estimated state) and H is defined by a development to the first order wherein all the errors concerning the movement quantities are expressed in the reference system of the carrier device:

$$\hat{R}^T x \approx \hat{R}^T \hat{x} + H \begin{pmatrix} \xi \\ \hat{R}^T(v-\hat{v}) \\ \hat{R}^T(x-\hat{x}) \\ b-\hat{b} \end{pmatrix}$$

In the case fo position observations from a GPS receptor, one will have $H=(0_{3,6}\ I_3\ 0_{3,8})$.

The covariance P produced by the propagation step is moreover updated 502 in a conventional way, in the following way:

$$P^+=(Id-KH)P$$

By convention, the notation "+" made in the present document to the output data of the update 500; $P^+$ therefore designates here the covariance produced by the updating.

In a step 503, a linear correction is calculated depending on the Kalman gain K and on the innovation Z.

The linear correction is equal to the innovation multiplied by a Kalman gain, as expressed by the formula below:

$$\begin{pmatrix} dX \\ db \end{pmatrix} = K \cdot Z$$

The linear correction, which is the term on the left in the equation above, consists of a vector dX corresponding to the variables of movement (position, speed, attitude for example) and of a vector db corresponding to the other variables, each in relation with the variables of the propagated state $\hat{X}$.

For at least one of the variables of the propagated state $\hat{X}$ concerned by the vector dX, the processor 20 calculates 504 a first corrective term expressed in the carrier device reference system Rp fixed relatively to the carrier device.

For example: are calculated:
a first corrective term $e_R$ relating to the orientation matrix $\hat{R}$;
a first corrective term $e_v$ relating to the speed vector $\hat{v}$;
a first corrective term $e_x$ relating to the position vector $\hat{x}$.

Each first corrective term depends on the exponential in the sense of Lie groups of the linear correction.

The whole of the first corrective terms results for example from the following matrix calculation:

$$\begin{pmatrix} e_R & e_v & e_x \\ 0_{1,3} & 1 & 0 \\ 0_{1,3} & 0 & 1 \end{pmatrix} = \exp \begin{pmatrix} 0 & -x_3 & x_2 & x_4 & x_7 \\ x_3 & 0 & -x_1 & x_5 & x_8 \\ -x_2 & x_1 & 0 & x_6 & x_9 \\ 0 & 0 & 0 & 0 & 0 \\ 0 & 0 & 0 & 0 & 0 \end{pmatrix}$$

In this matrix equation,
the left matrix comprises the first corrective terms, the terms $x_i$ are components of the sub vector dX (which is here of dimension 9 since it refers to the position vector of dimension 3, to the speed vector of dimension 3 and the orientation matrix);
the operator "exp" either designates an exponential of a matrix calculated exactly, or an exponential of an approximate matrix of order n>1, i.e. only the n first terms of the series $$1 + \frac{M}{1!} + \frac{M^2}{2!} + \frac{M^3}{3!} +,$$

defining the exponential of a matrix M are calculated. Preferably, the order n is greater than 2.

The processor 20 then proceeds with the calculation 505 of a second corrective term expressed in the inertial reference system Ri wherein the carrier device is mobile, by a reference system change applied to a first corresponding corrective term, which is itself expressed in the reference system of the carrier device Rp.

Three corrective terms $\delta R$, $\delta v$, $\delta x$ are obtained by this calculation.
a second corrective term $\delta R$ relating to the orientation matrix $\hat{R}$;
a second corrective term $\delta v$ relating to the speed vector $\hat{v}$;
a second corrective term $\delta x$ relating to the position vector $\hat{x}$.

The calculation of the second corrective terms is for example the following:

$$\delta R = e_R$$

$$\delta v = \hat{R} \cdot e_v$$

$$\delta x = \hat{R} \cdot e_x$$

It is here seen that the first corrective terms $e_v$ and $e_x$, which respectively relate to the speed and the position of the carrier device, are multiplied on the left by the reference system change matrix $\hat{R}$.

For each second corrective term, the processor adds 506 the second corrective term calculated at the value of the variable contained in the propagated state, as follows:

$$\hat{R}^+ = \hat{R} \cdot \delta R$$

$$\hat{v}^+ = \hat{v} + \delta v$$

$$\hat{x}^+ = \hat{x} + \delta x$$

The additional variables are updated in a conventional way:

$$\hat{b}^+ = \hat{b} + db$$

Definitively, the updating step in the sub steps have just been detailed transformed into a propagated state $\hat{X}$ containing the variable $\hat{R}$, $\hat{v}$, $\hat{x}$ and $\hat{b}$ in an updated state $\hat{X}^+$ containing updated variables $\hat{R}^+$, $\hat{v}^+$, $\hat{x}^+$ and $\hat{b}^+$ while taking into account secondary measurements (here of the GNSS type) provided by the secondary sensors 12.

In the updating step 500 which has just been described, it is seen that the linear correction is not directly added in step 506 to the propagated state $\hat{X}$.

Firstly, the (second) corrective terms which are used for the addition 50 are expressed in the inertial reference system Ri (after applying step 504), which gives the possibility of benefiting from similar advantages to those obtained by the use of an invariant Kalman filter, as defined in the article "*The invariant extended Kalman filter as a stable observer, A. Barrau and S. Bonnabel, Arxiv preprint, arXiv: 1410.1465*". However, the change in reference system is here directly applied during the updating step 500 of the extended Kalman filter; this change is therefore easier to implement in an existing navigation central unit and operating in real time.

Secondly, the (second) corrective terms used for the additive updating carried out in step 506 are issued from an exponential transformation step (step 504), which has the effect of accelerating the convergence of the extended Kalman filter.

Ageing of Data Used for the Kalman Filter

In the navigation central unit 1 operating on the basis of primary sensors 11 and secondary sensors 12, the primary sensors 11 and the secondary sensors 12 do not necessarily operate at the same rate, so that the average period for receiving measurements acquired by the primary sensors 11 may be different from the average period for receiving measurements acquired by the secondary sensors 12.

For example, it is standard that an inertial hybrid/GNSS central unit operates with an average period for receiving GNS measurements provided by the GNSS receptor 12 equal to 3.84 seconds, and at the average period for receiving inertial increments provided by the inertial sensors much lower (the arrival frequency of the inertial increments is in other words much faster than the frequency of arrival of the GNSS measurements).

The extended Kalman filter is conventionally configured for triggering calculations for updating 500 according to the rate of arrival of the secondary measurements GNSS.

Figure 5:
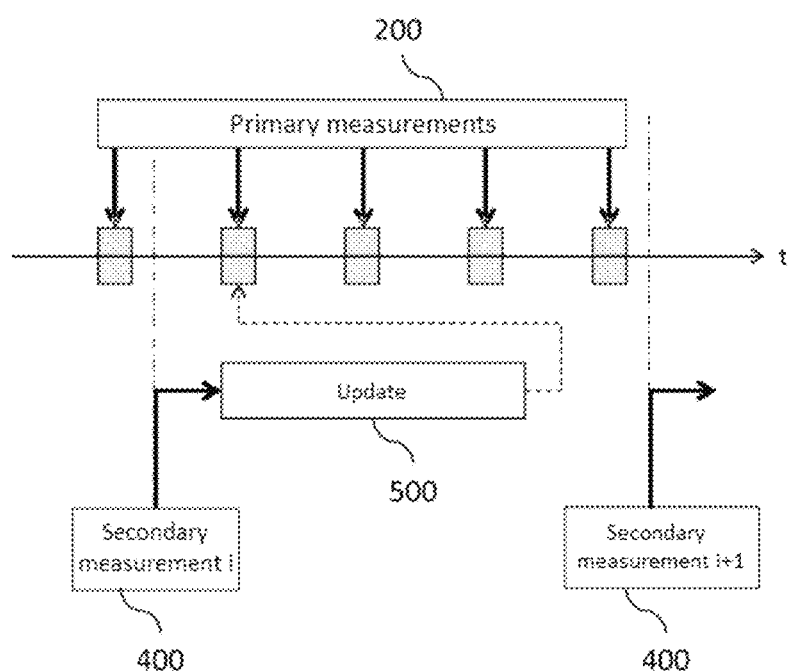
FIG. 5 is a time diagram illustrating arrival instants of acquired measurements and periods of processing operations performed by a navigation central unit.

This phenomenon is illustrated in FIG. 5. In this figure, each square schematically represents the processing of new inertial increments $\Delta v$, $\Delta\theta$ provided by the primary sensors of the inertial type 11.

Figure 4:
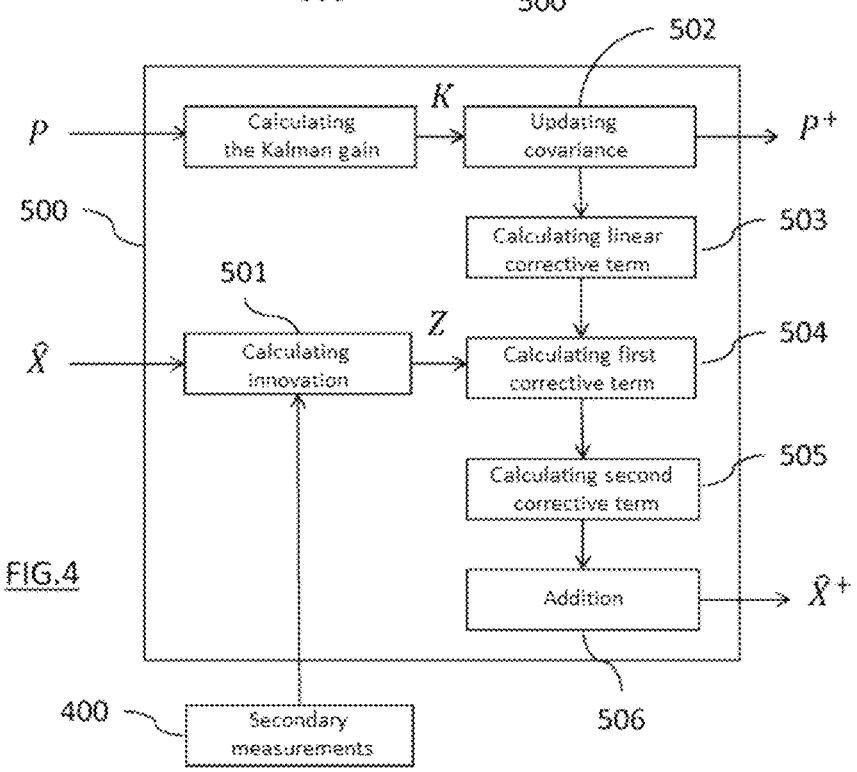

In an ideal system in which the updating calculations 500 would be instantaneous, i.e. with zero period, the updating step $\hat{X}^+$ would be available as soon as the instant t of arrival of the inertial increments immediately following the instant of arrival of the GNSS measurements which are used for updating calculations (this ideal availability being represented by the arrow in dotted lines in FIG. 4).

Now, the updating calculations 500 in practice last for a non-negligible period. Accordingly, the inertial primary measurements may have caused a time-dependent change in the estimated state during the occurrence of the updating calculations 500, so that the result of the update 500 is in practice obsolete relatively to the propagated estimation.

In order to circumvent this problem of obsolescence, and thereby improve the accuracy of the estimations calculated by the extended Kalman filter, it is possible to adjust the value of certain of the corrective terms which are involved in the calculations of the update 500, this adjustment having the function of simulating the time-dependent change, or the ageing of these corrective terms during the period for the calculations of the update 500.

By convention, "an ageing transformation" refers to a transformation converting a corrective term into an adjusted corrective term during the period $\Delta t$ of an iteration of the extended Kalman filter (i.e the duration which separates the triggering of the updating of a given iteration, and the triggering of the update of the subsequent iteration).

A first ageing transformation may for example be applied to at least one of the first corrective terms $e_g$, $e_v$, $e_x$ (i.e. the corrective terms resulting from the exponential calculation made on the basis of the linear correction depending on the innovation Z).

The first transformation of a first corrective term preferably comprises a change of basis of the first relevant corrective term, the destination basis of this change being selected to be invariant by action of a group. Such a group is for example described in the document "*The invariant extended Kalman filter as a stable observer, A. Barrau and S. Bonnabel, Arxiv preprint, arXiv:1410.1465*".

Such a change in basis is particularly advantageous since it gives the possibility of significantly accelerating the aging treatment.

The adjustment may thus comprise the following calculations:

$$\begin{pmatrix} \tilde{e}_R & \tilde{e}_v & \tilde{e}_x \\ 0_{1,3} & 1 & 0 \\ 0_{1,3} & 0 & 1 \end{pmatrix} = \begin{pmatrix} \hat{R}_t & \hat{v}_t & \hat{x}_t \\ 0_{1,3} & 1 & 0 \\ 0_{1,3} & 0 & 1 \end{pmatrix} e_1 \begin{pmatrix} \hat{R}_t & \hat{v}_t & \hat{x}_t \\ 0_{1,3} & 1 & 0 \\ 0_{1,3} & 0 & 1 \end{pmatrix}^{-1}$$

$$\overline{e}_R = \tilde{e}_R$$

$$\overline{e}_x = \tilde{e}_x + \Delta T \cdot \tilde{e}_v + \int\int g$$

$$\overline{e}_v = \tilde{e}_v + \int g$$

$$\overline{e} = \begin{pmatrix} \overline{e}_R & \overline{e}_v & \overline{e}_x \\ 0_{1,3} & 1 & 0 \\ 0_{1,3} & 0 & 1 \end{pmatrix}$$

$$\begin{pmatrix} e'_R & e'_v & e'_x \\ 0_{1,3} & 1 & 0 \\ 0_{1,3} & 0 & 1 \end{pmatrix} = \begin{pmatrix} \hat{R}_{t+\Delta t} & \hat{v}_{t+\Delta t} & \hat{x}_{t+\Delta t} \\ 0_{1,3} & 1 & 0 \\ 0_{1,3} & 0 & 1 \end{pmatrix} \overline{e} \begin{pmatrix} \hat{R}_{t+\Delta t} & \hat{v}_{t+\Delta t} & \hat{x}_t \\ 0_{1,3} & 1 & 0 \\ 0_{1,3} & 0 & 1 \end{pmatrix}^{-1}$$

In these equations,
$\int g$ designates the integral of the gravity vector calculated in an estimated position of the carrier device between the instants t and t+$\Delta t$,
$\int\int g$ designates the double integral of the gravity vector calculated on the position estimated between the instants t and t+$\Delta t$.
$e'_R$, $e'_v$, $e'_x$ are the first adjusted terms.
$I_x$ designates an identity block of order n, and
$0_{xx}$ designates a square block of order n for which all the terms are zero.

The first adjusted corrective terms $e'_R$, $e'_v$, $e'_x$ are used as input data to step 505 producing the second corrective terms by change in reference system.

An ageing transformation may alternatively (or additionally) be applied to at least one linear corrective term resulting from the multiplication of the innovation Z and of the Kalman gain K.

The ageing transformation applied to a corrective linear term $\epsilon$ may be of the following form:

$$\epsilon \rightarrow \Phi \epsilon$$

Wherein $\Phi$ is defined as earlier. The same trick involving the matrices $\Phi^{bd}$, $\text{Ad}(\hat{X}_t)$, $\text{Ad}(\hat{X}_{t+\Delta t})$ and $\tilde{F}$ may also be used.

Two successive ageing treatments applied during two successive iterations of the Kalman filter may, in an embodiment be independent of each other.

However, in another embodiment, an ageing treatment applied during a given iteration of the Kalman filter on a corrective term depends on preceding ageings relating to the same corrective term. In this case, the processor has during a preceding iteration:

applied an approximate ageing transformation to the relevant corrective term, calculated a deviation representing an approximation error in the application of this approximate ageing transformation, stored this deviation in memory.

It is understood that this principle may be generalized to the N preceding iterations: it may thus store in memory a deviation representing an accumulated approximation error in the application of an ageing transformation of these N preceding iterations of the extended Kalman filter.

At the current iteration (which follows the N preceding iterations), is further applied an ageing transformation approximate to the corrective term to be adjusted.

However, this corrective term is subject to an additional correction taking into account the accumulated deviation stored in memory during the N preceding iterations.

The calculation of the deviation between the aged corrective term and its approximation may assume the form of a difference in the sense of a group law, of a vector difference, or of a vector difference corrected by additional terms from the formula of Baker-Campbell-Hausdorff.

Such an embodiment gives some flexibility of implementation of the adjustment step, which aims at ageing a corrective term involved in the calculations for updating the extended Kalman filter.

Indeed, it may happen that the theoretical optimum ageing treatment cannot be conducted immediately. It is then preferred to apply an approximate ageing treatment, therefore less accurate, but this without any delay, while storing in memory the error induced by this approximation so as to be used subsequently.

Ageing of the Secondary Measurements

In certain architectures of hybrid navigation central units, the instant for starting the calculations for updating may be forced so that there may exist a significant delay between the instant at which is received a new second measurement (for example GNSS in the case of inertial/GNSS hybrid central units) and the instant at which the updating calculations using this new measurement are actually started (this phenomenon being also illustrated in FIG. 4).

The secondary measurements provided are therefore in this case already obsolete at the instant when the updating calculations are started.

This obsolescence may be corrected by an ageing treatment applied to the last obtained secondary measurement Y.

According to a first alternative, the ageing treatment applied to the last secondary measurement received comprises a time extrapolation of the last secondary measurement received at the subsequent instant for starting the updating calculations.

This extrapolation may depend on earlier secondary measurement(s) and/or on at least one state estimated earlier by the extended Kalman filter.

According to a second alternative, the ageing treatment applied to the last secondary measurement received comprises a modification of the applied observation function for updating the covariance matrix P.

The invention claimed is:

1. A method for tracking a mobile carrier device, wherein an extended Kalman filter (EKF) estimates during successive iterations a current navigation state of the carrier device, an iteration of the filter (EKF) comprising the steps of:

propagating a preceding navigation state of the carrier device into a propagated state according to a cinematic model and/or to measurements acquired by at least one inertial sensor, said measurements acquired in a fixed reference system (Rp) attached to the mobile carrier device, updating the propagated state according to measurements acquired by at least one navigation sensor, the method being characterized in that, for at least one navigation variable of the carrier device contained in the propagated state, the updating comprises sub-steps of:

calculating a linear correction term from an innovation representative of a deviation between the measurements acquired by the navigation sensor and the propagated state, calculating an exponential of the linear correction in the sense of a Lie group, calculating a first corrective term expressed in the fixed reference system (Rp), the first corrective term depending on said exponential, calculating a second corrective term expressed in an inertial reference system (Ri) wherein the carrier device is mobile, by the fixed reference system change applied to the first corrective term, adding the second corrective term to the value of the variable contained in the propagated state, the state containing the result of this addition being used as an output state of the iteration, updating an estimation of the current navigation state of the carrier device based on the result.

2. The method according to claim 1, wherein the linear correction is equal to the innovation multiplied by a Kalman gain.

3. The method according to claim 1, wherein calculating the second corrective term comprises multiplying a rotation matrix with the first corrective term.

4. The method according to claim 1, comprising adjusting at least one of the corrective terms, before its use by the filter, by means of an ageing transformation of said corrective term during the duration of an iteration of the extended Kalman filter.

5. The method according to claim 4, wherein adjusting the corrective term comprises sub-steps of:

applying an additional correction of the corrective term according to a deviation stored in memory representing an accumulated approximation error in the application of an ageing transformation of at least one preceding iteration of the filter, applying the ageing transformation to the shifted corrective term.

6. The method according to claim 4, wherein adjusting the first corrective term is applied by means of a transformation comprising a basis change of the first corrective term into a destination basis, the destination basis being invariant under the action of a group.

7. The method according to claim 4, wherein adjusting the first corrective term comprises applying a transformation of the linear corrective term $\epsilon$ of the following form:

$$\epsilon \rightarrow \Phi \epsilon$$

wherein $\Phi$ is a matrix for which at least one block is calculated by the formula $\mathrm{Ad}(X_{t+\Delta t})^{-1}\tilde{F}\mathrm{Ad}(X_t)$, wherein Ad(.) is an adjoint matrix in the sense of the Lie group theory, $\tilde{F}$ is a propagation matrix, and $\Delta t$ a period of iteration of the extended Kalman filter.

8. The method according to claim 7, wherein $\tilde{F}$ has one of the following forms:

$$\tilde{F} = \begin{pmatrix} I_3 & 0_{3,3} & 0_{3,3} \\ \int g & I_3 & 0_{3,3} \\ \iint g & \Delta T \cdot I_3 & I_3 \end{pmatrix}; \text{ or}$$

$$\tilde{F} = \begin{pmatrix} I_3 & 0_{3,3} \\ \int g & I_3 \end{pmatrix}; \text{ or}$$

$$\tilde{F} = I_6;$$

wherein:
$\int g$ designates the integral of a gravity vector calculated in an estimated position of the carrier device between the instants t and t+$\Delta$t;
$\iint g$ designates the double integral of the gravity vector calculated in an estimated position of the carrier device between the instants t and t+$\Delta$t;
$I_3$ designates an identity block of order 3,
$0_{3,3}$ designates a square block of order 3 for which all terms are zero.

9. The method according to claim 1, wherein the propagation applies a Riccati equation of the following form:

$$P_{t+\Delta T} = \Phi P_t \Phi^T + \Delta T \cdot Q$$

wherein $\Phi$ is a matrix for which at least one of the blocks is calculated by the formula $\mathrm{Ad}(\hat{X}_{t+\Delta t})^{-1}\tilde{F}\mathrm{Ad}(\hat{X}_t)$, wherein Ad(.) is an adjoint matrix in the sense of the Lie group theory, $\tilde{F}$ is a propagation matrix, and $\Delta t$ is a period of iteration of the extended Kalman filter.

10. The method according to claim 1,
for which the steps are applied by a plurality of Kalman filters configured with different initial conditions, and operating in parallel so as to produce a plurality of candidate estimations of the navigation state of the carrier device,
further comprising producing a consolidated estimation of the navigation state of the carrier device from the plurality of candidate estimations, the consolidated estimation depending on a comparison between each candidate estimation and the measurements acquired by the navigation sensor.

11. The method according to claim 1, wherein at least one navigation sensor is a receptor for receiving radio navigation signals emitted by satellites.

12. A computer program product comprising code instructions of a program for executing steps of the method according to claim 1, when this program is executed by a computer.

13. A device for tracking a mobile carrier device comprising:
an interface for receiving primary measurements acquired by at least one inertial sensor, said primary measurements acquired in a fixed reference system (Rp) attached to the mobile carrier device,
an interface for receiving secondary measurements acquired by at least one navigation sensor,
at least one processor configured for applying an extended Kalman filter during successive iterations for estimating a current navigation state of the carrier device, an iteration of the filter comprising:
propagating a preceding navigation state into a propagated state depending on a cinematic model and/or the primary measurements,
updating the propagated state according to navigation measurements,
the device being characterized in that the processor is further configured for updating at least one navigation variable of the propagated state, wherein said updating comprises substeps of:
calculating a linear correction term from an innovation representative of a deviation between the measurements acquired by the navigation sensor and the propagated state,
calculating an exponential of the linear correction in the sense of a Lie group,
calculating a first corrective term expressed in the fixed reference system, the first corrective term depending on said exponential,
calculating a second corrective term expressed in an inertial reference system wherein the carrier device is mobile, by a reference system change applied to the first corrective term,
adding the second corrective term to the value of the variable in the propagated state, the state containing the result of this addition being used as an output state of the iteration, said output state for estimating the current navigation state of the mobile carrier device.

14. A navigation central unit for a mobile carrier device, comprising:
said at least one inertial sensor,
said at least one navigation sensor, and
at least one device for tracking navigation according to claim 13.

15. The navigation central unit according to claim 14, wherein said at least one navigation sensor is a receptor for receiving radio navigation signals emitted by satellites.

* * * * *